United States Patent [19]

Tucker

[11] Patent Number: 5,435,630
[45] Date of Patent: Jul. 25, 1995

[54] TIRE RIM AND HUBCAP PROTECTOR

[76] Inventor: Roshawn Tucker, 4203 Ironside, Waterford, Mich. 48329

[21] Appl. No.: 233,497

[22] Filed: Apr. 26, 1994

[51] Int. Cl.⁶ .............................................. B60B 7/06
[52] U.S. Cl. .................................. 301/37.1; 301/37.36
[58] Field of Search ................. 301/37.1, 37.36, 37.42; 118/504, 505

[56] References Cited

U.S. PATENT DOCUMENTS

| | | |
|---|---|---|
| 2,627,839 | 2/1953 | Hudgins et al. ...................... 301/37.1 |
| 2,728,323 | 7/1953 | Walton et al. . |
| 3,313,501 | 11/1964 | Williams . |
| 3,854,448 | 12/1974 | Kromanaker .................. 301/37.1 X |
| 4,190,939 | 3/1980 | Keller . |
| 4,252,169 | 2/1981 | Watts . |
| 4,734,312 | 3/1988 | Sugiyama . |
| 4,784,440 | 11/1988 | Fair ..................... 301/37.1 |
| 4,844,005 | 7/1989 | Filomeno . |
| 4,874,206 | 10/1989 | Sampson ........................... 301/37.1 |

FOREIGN PATENT DOCUMENTS 4012901  1/1989  Japan ................................ 301/37.36

*Primary Examiner*—Russell D. Stormer
*Attorney, Agent, or Firm*—Weintraub, Duross & Brady

[57] ABSTRACT

A protective covering device suitable for protecting the surface of the wheel rim of an automobile against damage by toxic cleaning solutions used to clean the surrounding tire. The shield is temporarily attached to the rim with a grasping device which provides assistance to the user who is holding the protective device over the rim while applying cleaning solution to the surrounding tire.

9 Claims, 1 Drawing Sheet

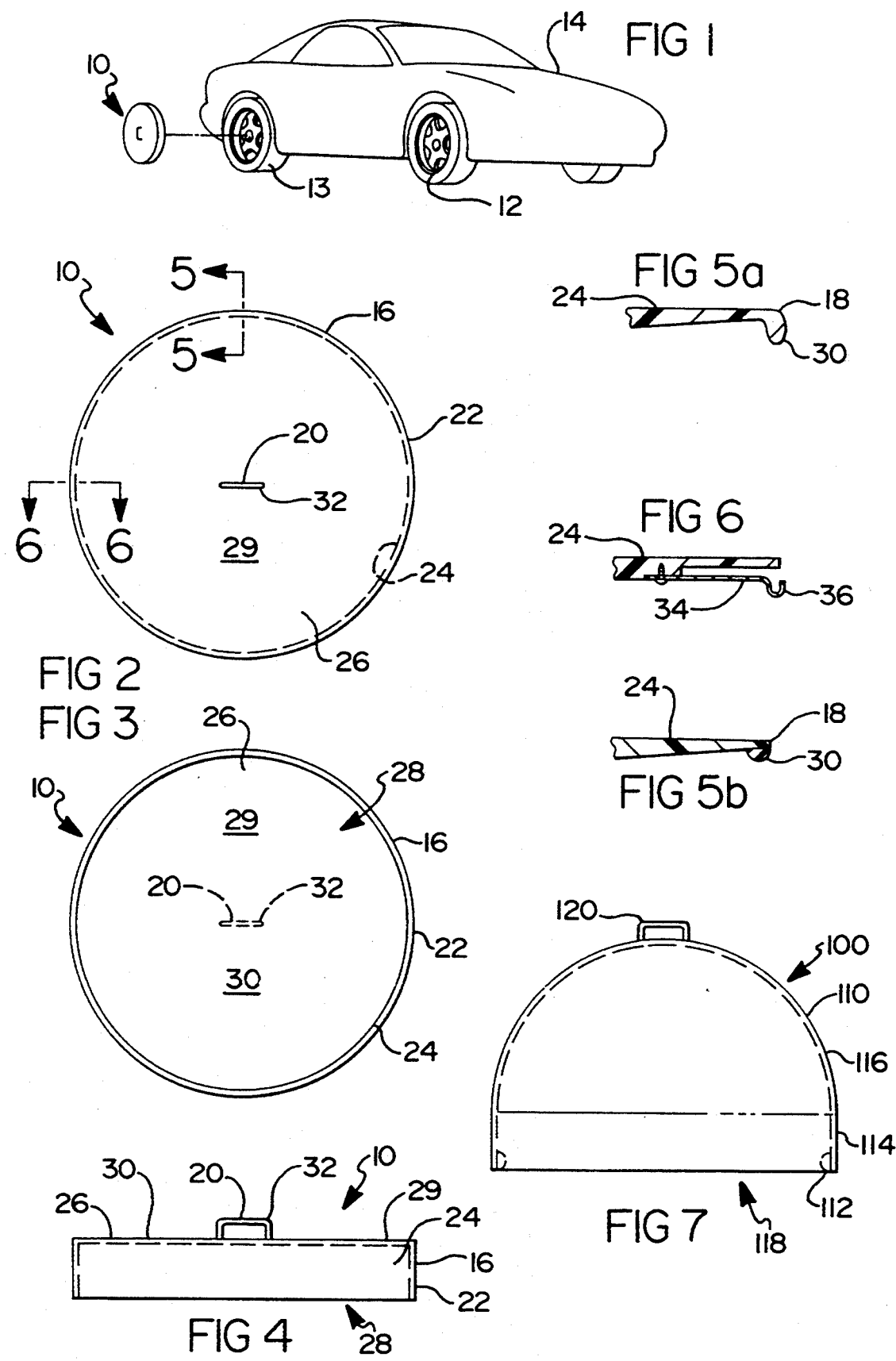

TIRE RIM AND HUBCAP PROTECTOR

FIELD OF INVENTION

This invention relates to devices for protecting vehicle parts during cleaning. More specifically, the invention relates to devices or shields for protecting vehicle wheel rims when cleaning vehicle tires.

DESCRIPTION OF THE PRIOR ART

Protective devices or shields for protecting parts of vehicles while other operations are being performed have been in existence for several years. The most common use for protective devices has been during the painting of vehicles. Essentially, the protective device is applied to a portion of the vehicle that is not to receive paint. Thus, the portions which are to be painted can be painted and the protective device receives any spatter or careless paint spray.

A typical example of a paint protective device is U.S. Pat. No. 2,728,323, issued to Walton, which discloses a protective cover for automobile headlights during painting. Walton teaches a circular cover with a side wall which is placed over a headlight assembly and which frictionally engages the headlight assembly. The cover encloses the entire headlight assembly. Walton also teaches a split side wall which provides the flexibility and spring-like tension to engage the headlight assembly.

Protective devices are also used to protect vehicle wheels during the painting of the vehicle. U.S. Pat. No. 4,844,005, issued to Filomeno, discloses such a protective cover for automobile wheels. Filomeno teaches a free-standing oval shaped cover which is installed within the wheel-well of the automobile and in front of the wheel and tire. The protective cover totally covers the wheel and tire protecting them from paint being applied to the automobile in the vicinity of the wheel-well.

Also, protective covers have been used to protect vehicle wheels and tires from hazards other than paint. An example of such a protective device is U.S. Pat. No. 4,190,939, issued to Keller, which discloses a protective shield or sunscreen for a vehicle wheel and tire for use during extending parking periods. The shield has a circular cover with a side wall or skirt. Keller teaches that the side wall frictionally engages the tire, thus covering both the wheel and the tire.

Although the above-cited prior art references address protecting vehicle headlights and vehicle wheels in various situations, they do not address the problems that arise when cleaning the tires of the vehicle with toxic chemicals.

Very often, chemicals are used to clean the tires of the vehicle. These chemicals may be toxic to wheel rims and wheel covers such as hub-caps. The chemicals may stain or corrode the rims and covers which are made from metals such as aluminum.

The tire cleaning operations are usually short-term and do not take as long to accomplish as painting the vehicle. Also, tire cleaning is usually done by one person moving from tire to tire in a short period of time. Thus, a protective device must be easy to handle, portable and capable of being held in place for the period of use without tiring the user.

An inexpensive protective device which is portable, can be handled by one person and easily held in place over the wheel by the user while cleaning a tire would substantially reduce any damage to the wheels and wheel covers from chemicals used to clean the tires. It is to all of these goals that the present invention is directed.

SUMMARY OF THE PRESENT INVENTION

The present invention provides for a protective device for protecting vehicle wheel rims and wheel covers or hubcaps while cleaning tires with chemicals that are toxic to the rims and the wheel covers. The protective device generally comprises:

(a) a cylindrical shield which may be removably disposed between the tire and the wheel rim, the shield having means for engaging the wheel rim; and (b) means for manually setting and retaining the shield over the wheel rim.

The means for engaging cooperates with the means for setting and retaining to assist the user in holding the protective device in place over the wheel rim.

The shield preferably includes a cylindrical wall having a closed end formed therewith and an open end. The shield accesses the wheel rim through the open end of the wall.

The means for engaging the wheel rim preferably comprises a flexible lip integrally formed with the cylindrical wall proximate the open end. The lip frictionally engages the wheel rim when the shield is positioned over the wheel.

The means for manually setting and retaining the shield over the wheel preferably includes a handle disposed on the closed end of the shield. A user of the protective device grips the handle to set and retain the device over the wheel rim and wheel cover.

The present invention will be better understood with reference to the following detailed discussion and to the accompanying drawings, wherein like reference numbers refer to like elements and in which:

BRIEF DESCRIPTION OF THE DRAWINGS

FIG. 1 is an exploded perspective view of a first embodiment of the present invention in use with a vehicle;

FIG. 2 is a top plan view of an embodiment of the present invention;

FIG. 3 is a bottom plan view of an embodiment of the present invention;

FIG. 4 is a side elevational view of an embodiment of the present invention;

FIG. 5a is a partial sectional view of an embodiment of the present invention taken along line 5—5 of FIG. 2;

FIG. 5b is a partial sectional view of an alternative embodiment of the present invention taken along line 5—5 of FIG. 2.

FIG. 6 is a partial sectional view of another embodiment of the present invention taken along line 6—6 of FIG. 2; and FIG. 7 is a side elevational view of another embodiment of the present invention.

DETAILED DESCRIPTION OF THE PREFERRED EMBODIMENTS

Now with reference to the drawings, FIGS. 1-5, there is depicted therein an embodiment of a protective device in accordance with the present invention, generally denoted at 10, for protecting or shielding vehicle wheel rims 12 while cleaning tires 13 with cleaning chemicals The protective device 10 generally comprises:

(a) a cylindrical shield 16 adapted to be removably disposed over the wheel rim and between the tire and wheel rim, the shield having means for engaging the wheel rim; and (b) means 20 for manually setting and retaining the shield over the wheel rim.

As shown and as noted, the protective device 10 is used to cover a wheel rim 12 of a vehicle 14. The device 10 may be used to cover wheel rims without wheel covers or hub-caps or may be used to cover wheel rims 12 having wheel covers (not shown) or hub-caps (not shown), as will be described in greater detail below.

The cylindrical shield 16 may be made from a lightweight material, including lightweight metal, such as aluminum, plastic or reinforced cardboard.

The cylindrical shield 16 includes a cylindrical side wall 24 having a closed end 26 integrally formed with the side wall 24 and an open end 28 formed therein opposite the closed end 26. The open end 28 is adapted to access or receive the wheel rim 12. The closed end 26 of the shield 16 is preferably a flat cover surface 29 attached to the side wall 24. The cover surface 29 may be formed with the side wall 24 or may be attached to the side wall 24 by welding or the like. Alternatively, the cylindrical side wall 24 of the shield 16 is a hollow cylinder (not shown). The means 20 for manually setting and retaining the shield is disposed proximate one end of the cylinder. The other end of the cylinder is adapted to receive the wheel rim 12.

As shown in FIG. 5a, the cylindrical wall 24 also has means 18 for engaging the wheel rim 12. The means 18 for engaging preferably comprises a flexible lip 30 extending inward from the side wall 22 proximate the open end 28 which frictionally engages the wheel rim 12. The lip 30 is preferably made from a flexible material such as plastic, rubber or the like. Preferably, the lip 30 is integrally molded and unitary with the side wall 22. The lip 30 upon contact with an edge of the wheel rim 12 flexes inward toward the side wall 22 until it passes the edge of the wheel rim 12. After the lip 30 passes the edge of the wheel rim 12, it returns to its unflexed condition and urges against the wheel rim 12.

Alternatively as shown in FIG. 5b, the flexible lip 30 may be formed separately and then attached to the side wall 22 proximate the open end 28. The lip 30 may be attached to the side wall 22 by any suitable commercially available adhesive.

As shown in FIGS. 2, 3, 4 and 7, the means 20 for manually setting and retaining the shield 16 over the wheel rim 12 preferably comprises a handle 32 attached to the closed end 26 of the shield 16 by welding or the like. If the shield 16 is plastic, the handle 32 may be integrally formed with the shield 16. The handle 32 is adapted to be gripped by a hand of a user. The user may carry the shield 16 by the handle 32. Also, the user holds the shield 16 in place over the wheel rim 12 via the handle 32.

The means 18 for engaging and the means 20 for setting and retaining the shield 16 cooperate to assist the user in retaining the shield 16 in position over the wheel rim 12 while the user cleans the exposed tire 13.

As shown in FIG. 6, the means 18 for engaging the wheel rim 12 may alternatively be a plurality of spring-like flexible strips 34 attached to the side wall 24 of the shield 16. Each flexible strip 34 has a crimp 36 disposed at one end which frictionally engages the edge of the wheel rim 12. The flexible strip 34 is preferably made from spring steel and is attached to the side wall 24 by a fastening device such as a screw, rivet, etc.

In FIG. 7, there is depicted another embodiment of the protective device 100 in accordance herewith. The device 100 includes a cylindrical shield 110 having means 112 for operatively engaging a wheel rim. The shield 110 comprises a cylindrical side wall 114, the side wall 114 having a convex shaped closed end 116 integrally formed with the side wall 114. The shield 110 also includes an open end 118 formed therein opposite the closed end 116. The open end 118 is adapted to provide access for a wheel rim. Further, the shield has means 120 for setting and retaining the shield over the wheel rim 12 and a hub-cap. The means 120 for setting and retaining cooperates with the means 112 for operatively engaging to assist the user in holding the shield 110 in place over a wheel rim and/or hub-cap.

In use, the user grips the device 10 by the handle 32 and, before cleaning a tire with the toxic cleaning solution, the user positions the device over the wheel rim. This enables the means for engaging 18 or 112 to grasp the wheel rim. After the protective device is in the position over the wheel rim, the user is then free to clean the surrounding tire with the toxic cleaner. The protective device prevents the toxic cleaner from reaching the wheel rim 12, thus, preventing any corrosion or staining of the wheel rim by the toxic cleaner.

The protective device of the present invention provides for an effective shield for a wheel rim from toxic cleaners used to clean the surrounding tire. The protective device provides for ease of handling and being held in place for temporary use. The device also provides for ease of removal from the wheel rim when it is no longer needed as a shield for the rim.

Having thus described the present invention, what is claimed is:

1. A protective device for covering a vehicle wheel rim while cleaning a tire associated therewith, the protective device comprising:

(a) a cylindrical shield adapted to be removably disposed between the tire and the wheel rim, the shield comprising:

(1) a cylindrical side wall, the side wall having a closed end integrally formed therewith and an open end formed therein opposite the closed end, the open end interfacing the wheel rim; and (2) a flexible lip extending inwardly from the cylindrical side wall proximate the opened end, the flexible lip frictionally engaging the wheel rim and urging there against;

(b) a handle attached proximate the closed end of the shield; and wherein the flexible lip cooperates with the handle to assist in holding the shield over the wheel rim.

2. The protective device of claim 1, wherein the closed end comprises:

an essentially flat surface, the flat surface covering a vehicle wheel rim without a hub-cap.

3. The protective device of claim 1, wherein the flexible lip is made from a flexible material integrally molded and unitary with the side wall.

4. The protective device of claim 1, wherein the flexible lip is made from plastic.

5. A protective device for covering a vehicle wheel rim and hub cap while cleaning a tire associated therewith, the protective device comprising:

(a) a cylindrical shield removably disposed between the tire and the wheel rim, the shield having means for engaging the wheel rim, the cylindrical shield comprising:
  (1) a cylindrical side wall;
  (2) a closed end, the closed end being convex shaped and integrally formed with the side wall;
  (3) an open end formed therein opposing the closed wall, the open end adapted for receiving the wheel rim and hub-cap; and
  (4) a flexible lip extending inward from the cylindrical side wall proximate the open end, the flexible lip frictionally engaging the wheel rim and urging there against;
(b) a handle attached proximate the closed end of the shield; and
wherein the flexible lip and the handle cooperate to dispose the shield over the wheel rim and hub-cap.

6. A protective device for covering a vehicle wheel rim while cleaning a tire associated therewith, the protective device comprising:

(a) a cylindrical shield adapted to be removably disposed between the tire and the wheel rim, the cylindrical shield comprising:
  (1) a cylindrical side wall, the side wall having a closed end integrally formed therewith, and an open end formed therein opposing the closed end for receiving the wheel rim; and
  (2) a plurality of spring-like flexible strips attached to the side wall, each of the plurality of strips frictionally engaging the wheel rim;
(b) a handle attached to the closed end of the cylindrical shield; and
wherein the flexible strip and the handle facilitate deployment of the shield over the wheel rim.

7. The protective device of claim 6, wherein the closed end of the cylindrical shield is essentially a flat surface.

8. The protective device of claim 6, wherein the closed end of the cylindrical shield is essentially a convex surface.

9. The protective device of claim 6, wherein the flexible strips are a spring-like metal.

* * * * *